United States Patent [19]

Betzing et al.

[11] 3,862,968

[45] Jan. 28, 1975

[54] PROCESS OF METHYLATING CEPHALINS

[75] Inventors: Hans Betzing, Horrem; Dac Lekim, Cologne, both of Germany

[73] Assignee: Nattermann, A. & Cie GmbH, Cologne, Germany

[22] Filed: May 30, 1973

[21] Appl. No.: 365,139

[30] Foreign Application Priority Data

May 30, 1972 Germany............................ 2226291

[52] U.S. Cl. ............................................... 260/403
[51] Int. Cl. ............................................. A23j 7/00
[58] Field of Search ................................... 260/403

[56] References Cited
UNITED STATES PATENTS 3,031,478  4/1962  Klenk et al. ........................ 260/403
3,772,360  11/1973  Pfeiffer et al. ..................... 260/403

Primary Examiner—Elbert L. Robert
Attorney, Agent, or Firm—Karl W. Flocks

[57] ABSTRACT

Phosphatidylethanolamine or serine, which may be pure or be present in the mixture with other phosphatides, can be methylated in a simple and gentle manner by reacting the phosphatides with formaldehyde in the presence of formic acid, in which connection at least 2 moles formaldehyde and 2 moles formic acid are employed per amino group, whereafter the so-obtained dimethylcephalin or dimethylserinecephalin may optionally be methylated further with methyl iodide to the corresponding quaternary ammonium compounds.

8 Claims, No Drawings

PROCESS OF METHYLATING CEPHALINS

The commercial phosphatide products ordinarily consist of mixtures of chemically-different phosphatides, of which the main representative may be designated as phosphatidyl-choline (lecithin). The presence of phosphatidylethanolamine exerts a disturbing influence in the therapeutic application of phosphatide fractions, just as in the employment of phosphatides as emulsifiers for oil-in-water emulsions in intravenous fat feeding. Accordingly, it is of decisive importance for the applicability, compatibility and effectiveness that the phosphatides be fractionated, in which connection the obtained separation of the phosphatidylethanolamine from such crude phosphatide mixtures should be as complete as possible, in order to obtain compatible phosphatidylcholine concentrates. Even if only in part, such fractionation can be obtained, for example, through the fact that the separate phosphatides have different solubilities. Other methods make use of the differential polarity of separate phosphatides and of the differing behavior in relation to absorbents which is caused by such a differing polarity.

The two known methods are associated with disadvantages. In the case of the solvent fractionation, the separation of cephalin, i.e., of the phosphatidylethanolamine, is still very incomplete. On the other hand, in the case of the chromatographic processes, in association with unsatisfactory yields, the polar phosphatides are frequently bound so firmly to the absorbent that a recovery is not possible.

The expensive separation of the phosphatidylethanolamine from phosphatidylcholine-containing fractions, as well as the knowledge that in its usage the free amino group of the phosphatidylethanolamine is responsible for the side effects, such as fever, vomiting and chills, that occur repeatedly, especially in connection with i.v. application of such phosphatide fractions, have led to the attempts of subjecting the ethanolamine group to a chemical change.

Thus, the U.S. Pat. No. 3,301,881 describes a process of acylating or of partly acylating aqueous emulsions of phosphatides with organic acid-anhydrides, in which connection the primary amino group of the phosphatidylethanolamine is converted into an acid amide. This is indicated to make the phosphatides more plastic and more readily dispersible in aqueous media.

The German patent application Ser. No. P 19 49 399.3 discloses a process wherein a deamination of phosphatides comprising a primary amino group (phosphatidylethanolamine and serine) is performed. Glycol phosphatides are formed in this connection. In contrast with the starting phosphatides, these phosphatides are soluble in alcohol, possess a better solubility in water and no longer exhibit the disturbing blood-coagulation activity of the cephalins.

Attempts have also been made to modify the amino group of the cephalins through an ordinary methylation. However, Baer and Maurukas (J. Biol. Chem., 212 39 (1955) as well as H. D. Crone (Biochem. Biophys. Acta, 84,665 (1964)) have shown that no noteworthy amounts of the N,N-dimethyl compounds of the phosphatides to be expected are formed during the methylation of phosphatidylethanolamine with diazomethane. Rather, there occurs only a degradation of the ethanolamine to the corresponding dimethyl esters of the phosphatide acid. Phosphatidylethanolamine can be methylated only very incompletely even by means of methyliodide.

Unexpectedly, it has now been that that in accordance with the present invention phosphatidylethanolamine or serine, which may be pure or be present in the mixture with other phosphatides, can be methylated in a simple and gentle manner by reacting the phosphatides with formaldehyde in the presence of formic acid, in which connection at least 2 moles formaldehyde and 2 moles formic acid are employed per amino group, whereafter the so-obtained dimethylcephalin may optionally be methylated further with methyl iodide to the corresponding quaternary ammonium compounds.

The methylation of the invention occurs without significant hydrolysis and even without destruction of the phosphatides that are normally so unstable. Above all, no chemical change in the sensitive unsaturated or polyunsaturated fatty acids is observed in connection with this process. The phosphatidyl-N,N-dimethylethanolamines or serines produced in accordance with the process no longer show a reaction to ninhydrin and also the IR band at 9.8 $\mu$, characteristic for NH-2-containing phosphatides, is no longer present.

The methylation of the primary amino group is preferably performed in such a manner that the phosphatides are reacted with formaldehyde in the presence of concentrated formic acid. The phosphatides are suitably first dissolved in an organic solvent while subjected to stirring and while under protection of an inert gas. While the solution is stirred and heated, paraformaldehyde and formic acid are then added to it or a mixture of formalin and concentrated formic acid is added by drops to the solution.

In contrast with the free amino compound, the dimethylamino compounds thus obtained can then be methylated readily further with methyl iodide to the quaternary trimethyl compound, i.e., to the choline stage, if desired.

As suitable solvents, there may be used chlorine-containing hydrocarbons, such as carbontetrachloride, trichloroethylene, chloroform, dichloroethane, etc.; hydrocarbons, above all, aromatic hydrocarbons, such as benzene and toluene, etc.; dimethylformamide; dioxane and tetrahydrofuran. If the phosphatides or phosphatide factions to be methylated are reacted directly with a mixture of formalin and formic acid, without application of organic solvents, the reaction will take place in an aqueous medium, under heat and stirring. The progress of the reaction can be pursued through thin layer chromatographic separation of the product of the reaction, for example, on silica-gel-G-plates in the chloroform-methanol-water (65:25:4) moving phase and spraying with ninhydrin. After the completion of the methylation, the reaction with ninhydrin is negative, i.e., the amino group of the ethanolamine or serine-containing phosphatides changed into a dimethylamino group.

It must be considered as unexpected that no destruction of the molecule takes place when the known methylation method employing formaldehyde and formic acid in accordance with Eschweiler and Clarke, which is performed as such in the strongly acid medium and at high temperatures, is used on such sensitive materials as plant and animal phosphatides. Rather, one would expect that the two fatty-acid esters of the phosphatide would be split off and destroyed under such vigorous conditions of reaction. This is true above all for the sensitive polyunsaturated fatty acids, such as linoleic acid and linolenic acid that exist, for example, in an amount of about 65% among the fatty acids in the phosphatidylethanolamine from soybeans.

A further surprise is to be seen in the fact that the formation of by-products practically does not occur. As a rule, large amounts of aldehyde, mono-and trimethylamine products are also formed in addition to the desired dimethyl compounds during methylations with formaldehyde and formic acid.

Practically, the method of the invention for the methylation of phosphatidylethanolamine or serine proceeds in such a manner that either pure ethanolamine or serine cephalin (as it can be obtained, for example, through column-chromatogaphic separation of cephalin-rich phosphatide fractions on silica gel columns through elution with chloroform-methanol mixtures) or cephalin-containing phosphatide fractions, that may contain oil or be freed of oil, are dissolved in a chlorinated or aromatic hydrocarbon, such as carbon tetrachloride, trichloroethylene, dichloroethane, benzene or toluene or in dimethylformamide, dioxane or tetrahydrofuran. Paraformaldehyde is introduced first into this solution and, indeed, in an amount of at least 2 moles $CH_2O$ per amino group, whereafter the mixture is heated preferably to a temperature of 60°–100°C while the formic acid is introduced by drops. The heating is continued until the phosphatide no longer exhibits a reaction with ninhydrin. After cooling to room temperature, the acid, watery layer is separated from the organic phase, the latter is washed first with bicarbonate or soda, then repeatedly with water and, finally, the solvent is removed vacuo under nitrogen, which results in a yellow to yellow-brown plastic product.

If an aqueous solution of formaldehyde (formalin) is employed in place of paraformaldehyde, the methylation can be performed also directly with formalin and formic acid in the form of an aqueous emulsion under reflux, without employing an organic solvent. However, for the purpose of the washing with bicarbonate solution and water, it is advisable in this connection to absorb the reactive mixture in a chlorine-containing hydrocarbon, e.g., chloroform, after the reaction is completed, in order to wash it neutral.

The phosphatidyl-N,N-dimethylethanolamine obtained through the methylation of cephalin in accordance with the invention is a known phosphatide that occurs in small amounts in nature, e.g., in the lungs and in the wheat germs. It may be considered as the direct precursor of the phosphatidylcholine (lecithin) that almost always prevails quantitatively among the phosphatides. This agrees also with the fact that the dimethyl compound in the organism is rapidly methylated to the choline stage. In contrast with this, the phosphatidylethanolamine is accessible only with a very great difficulty to a biochemical methylation, as shown clearly by a test with beef or rat liver microsomes. Five mg microsomes, obtained as 100,000-g-sediment during the centrifugation of beef or rat liver homogenate in the ultracentrifuge, was incubated with 0.1 $\mu$ mole phosphatidyl-N,N-dimethylethanolamine and 1 $\mu$ mole S-adenosylmethionin in 1 ml tris buffer (pH 8.4), at 37°C. The yield of phosphatidylcholine after one hour of incubation amounts to about 50%. If the phosphatidylethanolamine replaced the phosphatidyl-N,N-dimethylethanolamine, the yield of the formed phosphatidylcholine amounted to less than 1%.

Resorption studies with double-radioactively marked phosphatidyl-N,N-dimethylethanolamine showed that in the case of i.v. application the major portion of this phosphatide is incorporated intact as phosphatidylcholine into the liver after six hours. Also, this test shows the rapid transformation of the dimethyl grouping into the trimethyl grouping under physiological conditions and, consequently, the therapeutic importance of the N,N-dimethyl compounds, on which this application based, for the normalizing of disturbed metabolic processes, above all in blood and liver.

The fact that the fatty acid make-up of the phosphatides is not subjected to any detrimental effect can be considered as a special advantage of the new methylation process of cephalin and serine cephalin. This follows clearly from the following gas-chromatographic examination of the fatty acids before and after the methylation. In particular the highly-unsaturated fatty acids that are important for the biological or therapeutic activity, such as linoleic acid and linolenic acid, remain completely preserved. In this connection it was also not possible to detect a transformation of the naturally-occurring cis-form into the undesirable trans-form.

TABLE I

Comparative tests of the fatty acid compositions (determined by gas chromatography):

|  | Prior to the methylation (phosphatidyl-ethanolamine) | After the methylation (phosphatidyl-N,N-dimethylethanolamine) |
|---|---|---|
| palmitic acid | 21.6% | 21.2% |
| stearic acid | 3.3% | 3.2% |
| oleic acid | 8.3% | 8.1% |
| linoleic acid | 60.0% | 60.2% |
| linolenic acid | 6.8% | 7.3% |

The invention is to be explained more in detail below by means of some illustrative examples.

EXAMPLE 1

One hundred grams of pure phosphatidylethanolamine (cephalin), produced by column chromatography on silica gel from the phosphatide fraction of the soybean, which is not soluble in alcohol, as it is produced in the form of unsoluble residue through a repeated warm-alcohol extraction of the crude soybeam phosphatide which is freed of oil, are dissolved in 500 ml toluene under the protection of an inert gas and 40 g of paraformaldehyde is added to the solution while it is stirred and a reflux cooler is connected. After heating to 100°C, 90 ml 96% formic acid is added immediately by drops to the reactive mixture which is still stirred for 30 minutes at 100°C. When it is demonstrated through thin layer chromatography that ninhydrin-positive substances are not longer present, the product of the reaction is cooled, initially washed with water and then with a dilute solution of sodium bicarbonate. Finally, it is again washed with water, the water phases being cast away in each case. At the end, after drying the toluene solution and distilling off the solvent in vacuo, 92 g (92% of the theory) phosphatidyl-N,N-dimethylethanolamine is obtained in the form of a light yellow, plastic material that no longer exhibits a reaction to $NH_2$ groups and is characterized by the following analytical data:

P = 3.6%
C = 64.6%
H = 10.65%
N = 2.18%

EXAMPLE 2

Two kg of fresh beef brain is comminuted and extracted with a mixture of chloroform-methanol in the ratio of 2:1 in accordance with FOLCH. The extract is washed, dried and evaporated in vacuo under nitrogen. The yield of crude lipid extract: 120 g. In order to purify the phosphatidyl-serine, the crude extract is purified repeatedly on silica gel columns. The yield of the pure phosphatidylserine: 5 g.

The 5 g phosphatidylserine is dissolved in 150 ml dioxane under nitrogen and mixed with a mixture of 5 ml formalin and 6 ml formic acid. The methylation is completed after one hour of heating at 80°-90°C under nitrogen. After cooling to room temperature, the solvent is removed in vacuo and the residue is absorbed into 50 ml chloroform and washed with water 3-4 times. After drying with sodium sulfate, the chloroform is distilled off in vacuo under nitrogen. There remain 4 g (80% of the theory) crude phosphatidyl-N,N-dimethylserine. After a thin layer chromatographic separation in the system chloroform-methanol-ammonia (70:30:5), the substance exhibits a Rf value of about 0.22 and is ninhydrin-negative. In contrast with phosphatidylserine, a distinct band can be determined at 10.6 $\mu$ under IR spectroscopic examination, which band is characteristic for the N,N-dimethyl group.

EXAMPLE 3

One hundred grams chemically pure phosphatidylethenolamine (cephalin), produced as described in Example 1 are dissolved in 300 ml dichloroethane under the protection of an inert gas and 35 g paraformaldehyde is added to the solution while it is stirred vigorously and a reflux cooler is connected. The mixture is heated to boiling and 80 ml 96% formic acid is then added immediately by drops. The reaction is completed after one hour of boiling under reflux and introduction of a weak stream of nitrogen. The reactive mixture is cooled, washed initially with water, the water phase separated and the washing is continued with a dilute solution of sodium bicarbonate and, finally, with water. The dichloroethane solution is then dried and the solvent is distilled off in vacuo. The result: 95 g (95% of the theory) phosphatidyl-N,N-dimethylethanolamine in the form of a yellow plastic substance.

EXAMPLE 4

Fifty grams of phosphatidylethanolamine, produced as described in Example 1, is dissolved in 250 ml dimethylformamide and 21 g paraformaldehyde is added to the solution while it is stirred and an inert gas is introduced. After the reactive mixture is heated to about 60°C, 50 ml concentrated formic acid is added by drops and the mixture is heated for 30 minutes at 100°C while a reflux cooler is connected. After cooling to room temperature, the product of the reaction is absorbed in water and repeatedly extracted with petroleum ether. The combined petroleum-ether extracts are washed with water, and after drying, the solvent is distilled off, at the end in vacuo. The yield: 47.5 g (95% of the theory) of phosphatidyl-N,N-dimethylethanolamine.

EXAMPLE 5

One kilogram alcohol-soluble soy phosphatide fraction comprising about 25% phosphatidylethanolamine, produced from crude soybean phosphatide, freed of oil, through repeated extraction with ethanol, combination of the extracts and evaporation of the solvent in vacuo, is suspended in 600 ml formalin (36% formaldehyde) while stirred and under nitrogen protection and heated to boiling while a reflux cooler is connected and a weak stream of nitrogen is passed through. After 600 ml (96%) formic acid is added by drops, the reactive mixture is heated under reflux for 2 hours, cooled and treated with a mixture of chloroform-methanol (2:1) for the purpose of extracting the phosphatides. After the chloroform solution is washed initially with a diluted solution of sodium bicarbonate and then with water, the solvent is distilled off in vacuo. The result: 980 g (98% of the theory) of an alcohol-soluble phosphatide comprising about 25% of phosphatidyl-N,N-dimethylethanolamine.

EXAMPLE 6

Five hundred grams of oil-containing crude soy phosphatide (oil content: about 33%) is dissolved in 1.2 l tetrahydrofuran under nitrogen protection and 70 g paraformaldehyde is added to the solution under stirring. After connecting a reflux cooler, the reactive mixture is mixed cautiously with 170 ml concentrated formic acid and heated for 20-30 minutes under reflux. Thereafter, the major portion of the solvent is distilled off under reduced pressure and the residue is mixed with water. The phosphatides are extracted from the aqueous solution with chloroform-methanol (2:1), the chloroform extract is washed initially with a diluted solution of sodium bicarbonate and then repeatedly with water. Finally, it is dried and the solvent is distilled off in vacuo under nitrogen. There remain 475 g (95% of the theory) of yellow-brown, semisolid oil-containing phosphatide, that consists of phosphatidyl-N,N-dimethyl-ethanolamine at about 20%.

EXAMPLE 7

One thousand grams of crude soybean phosphatide, merely freed of oil, as obtained in the form of unsoluble residue through repeated acetone treatment of commercial crude soybean phosphatide, is dissolved in 3 l chloroform and 220 g paraformaldehyde is added to the solution while it is stirred and a weak stream of nitrogen is introduced. After a reflux cooler is connected, the reactive mixture is heated to boiling and slowly mixed with 500 ml (96%) formic acid. The methylation is completed after two hours of heating under reflux. After the product of the reaction is cooled, it is mixed with water and the chloroform solution is worked up as described in Example 6. Yield: 910 g (91% of the theory) of a cephalin-free phosphatide mixture comprising about 20% phosphatidyl-N,N-dimethylethanolamine.

EXAMPLE 8

Five hundred grams of soybean phosphatide fraction, unsoluble in alcohol, as obtained in the form of unsoluble residue (content of phosphatidylethanolamine about 35%) after a soybean phosphatide freed of oil is treated repeatedly with alcohol under heat, is dissolved in 3 l trichloroethylene under the protection of an inert gas. While the solution is subjected to continuous stirring and heating, 175 g paraformaldehyde is added initially and 400 ml (96%) formic acid is then added by drops. The solution is still boiled for 30 minutes under reflux. After cooling, the product of the reaction is extracted initially with water, then with a diluted solution of sodium bicarbonate and, finally repeatedly with water. After the solution is dried and the solvent is removed in vacuo under nitrogen, there result 420 g (84% of the theory) of a phosphatide mixture which is not soluble in alcohol and comprises about 35% phosphatidyl-N,N-dimethyl-ethanolamine.

EXAMPLE 9

Two kg alcohol-soluble soyphosphatide fraction comprising about 25% phosphatidylethanolamine is dissolved in 8 l benzene and mixed with 260 g paraformaldehyde while stirred and heated and while a stream of nitrogen is passed through. To this mixture, 1200 ml 96% formic acid is added by drops, and it is heated still for about 40 minutes at 100°C. After thin layer chromatographic separation, the substance no longer exhibits a reaction to ninhydrin. For working up, the product of the reaction is cooled and processed as described in Example 8. Finally, there result 1800 g (90% of the theory) of an alcohol-soluble phosphatide fraction comprising about 25% phosphatidyl-N,N-dimethyl-ethanolamine.

EXAMPLE 10

Twenty grams egg lecithin (Merck, ex ovo) is dissolved in 200 ml dioxane while heated and a mixture of 20 ml formalin and 20 ml 96% formic acid is added slowly by drops to the solution at 80°C while the solution is stirred vigorously. After heating for 2 hours at 80°C, the reactive mixture is cooled, poured into 1 liter of icewater and the phosphatide is extracted with 3 × 200 ml chloroform. A possible cloudiness is eliminated through an addition of ethanol. The combined chloroform extracts are first washed with water, then with diluted solution of sodium bicarbonate and, finally, again with water, dried and concentrated. There is obtained 20 g of a yellow, plastic substance that consists in 10% of phosphatidyl-N,N-dimethylethanolamine, in 2% of phosphatidyl-N,N-dimethylserine and in 49% of phosphatidylcholine.

It will be obvious to those skilled in the art that various changes may be made without departing from the scope of the invention and the invention is not to be considered limited to what is described in the specification.

We claim:

1. A process of methylating a phosphatide of phosphatidylethanolamine or phosphatidylserine comprising mixing said phosphatide with formaldehyde in the presence of formic acid, in which connection at least 2 moles formaldehyde and 2 moles formic acid are employed per amino group, and heating the solution to a temperature no greater than about 100°C.

2. A process as in claim 1, wherein said phosphatide is in solution in an organic solvent for said phosphatide when mixed with said formaldehyde in the form of paraformaldehyde and wherein the formic acid is then added dropwise while the solution is heated.

3. A process in accordance with claim 1 further comprising reacting with methyliodide to further methylate to the corresponding quaternary ammonium compounds.

4. A process in accordance with claim 2 wherein said organic solvent is a chlorinated hydrocarbon, an aromatic hydrocarbon, dimethylformamide, dioxane or tetrahydrofuran.

5. A process in accordance with claim 1 wherein said phosphatide is mixed with aqueous formaldehyde in the absence of solvent.

6. A process in accordance with claim 1 wherein said formic acid is concentrated.

7. A process in accordance with claim 1 wherein said process is carried out under an inert atmosphere.

8. A process in accordance with claim 2 wherein said solution is heated to a temperature of 60°–100°C.

* * * * *